(12) United States Patent
Dieckmann et al.

(10) Patent No.: US 12,606,141 B2
(45) Date of Patent: Apr. 21, 2026

(54) MONOSTABLE AND FAULT-TOLERANT PARKING BRAKE VALVE ASSEMBLY

(71) Applicant: ZF CV Systems Global GmbH, Bern (CH)

(72) Inventors: Thomas Dieckmann, Pattensen (DE); Ralph-Carsten Lülfing, Garbsen (DE); Julian van Thiel, Grossburgwedel (DE); Oliver Wulf, Neustadt (DE)

(73) Assignee: ZF CV Systems Global GmbH, Bern (CH)

( * ) Notice: Subject to any disclaimer, the term of this patent is extended or adjusted under 35 U.S.C. 154(b) by 471 days.

(21) Appl. No.: 17/832,286

(22) Filed: Jun. 3, 2022

(65) Prior Publication Data

US 2022/0297655 A1     Sep. 22, 2022

Related U.S. Application Data

(63) Continuation of application No. PCT/EP2020/084045, filed on Dec. 1, 2020.

(30) Foreign Application Priority Data

Dec. 4, 2019    (DE) ..................... 10 2019 133 011.4

(51) Int. Cl.
*B60T 13/68*          (2006.01)
*B60T 13/38*          (2006.01)
*B60T 13/66*          (2006.01)
(52) U.S. Cl.
CPC .......... *B60T 13/683* (2013.01); *B60T 13/385* (2013.01); *B60T 13/662* (2013.01); *B60T 2270/402* (2013.01)
(58) Field of Classification Search
CPC .... B60T 13/683; B60T 13/385; B60T 13/662; B60T 2270/402; B60T 13/263
See application file for complete search history.

(56) References Cited

U.S. PATENT DOCUMENTS

| | | | |
|---|---|---|---|
| 6,410,993 B1 * | 6/2002 | Giers | B60T 8/321 |
| | | | 303/20 |
| 6,447,074 B2 * | 9/2002 | Engelhard | B60T 8/32 |
| | | | 303/3 |

(Continued)

FOREIGN PATENT DOCUMENTS

| | | |
|---|---|---|
| CN | 107548438 A | 1/2018 |
| CN | 107750215 A | 3/2018 |

(Continued)

OTHER PUBLICATIONS

English translation DE 102005024120 A1 (Year: Aug. 2024).*

(Continued)

*Primary Examiner* — Robert A. Siconolfi
*Assistant Examiner* — James K Hsiao
(74) *Attorney, Agent, or Firm* — Walter Ottesen, P.A.

(57)          ABSTRACT

A parking brake valve assembly for an electronically controllable pneumatic braking system of a vehicle is disclosed. The parking brake valve assembly includes: a first compressed air path which receives a supply pressure and has a first monostable valve unit for providing a first parking brake pressure, a second compressed air path which receives supply pressure and has a second monostable valve unit for providing a second parking brake pressure, and a first shuttle valve having a first shuttle valve port with the first compressed air path and receiving the first parking brake pressure, a second shuttle valve port with the second compressed air path and receiving the second parking brake pressure, and a third shuttle valve port connectable to a spring brake cylinder. The first shuttle valve outputs the higher of the first parking brake pressure and of the second parking brake pressure to the third shuttle valve port.

16 Claims, 5 Drawing Sheets

(56) References Cited

U.S. PATENT DOCUMENTS

| | | | | |
|---|---|---|---|---|
| 6,969,127 | B2 * | 11/2005 | Suzuki | B60T 13/741 |
| | | | | 303/20 |
| 7,866,761 | B2 * | 1/2011 | Gerum | B60T 8/321 |
| | | | | 303/127 |
| 9,327,694 | B2 * | 5/2016 | Klostermann | B60T 8/1708 |
| 9,434,366 | B1 * | 9/2016 | Taneyhill | B60T 13/263 |
| 10,501,062 | B2 * | 12/2019 | Wulf | B60T 8/94 |
| 10,730,499 | B2 * | 8/2020 | Otremba | B60T 13/662 |
| 10,946,848 | B2 * | 3/2021 | Van Thiel | B60T 13/683 |
| 11,407,394 | B2 * | 8/2022 | Hutchins | F16H 63/486 |
| 11,807,208 | B2 * | 11/2023 | Van Thiel | B60T 15/027 |
| 12,109,985 | B2 * | 10/2024 | Klostermann | B60T 13/683 |
| 2005/0116533 | A1 * | 6/2005 | Herges | B60T 15/14 |
| | | | | 303/3 |
| 2006/0071548 | A1 * | 4/2006 | Scheider | G01R 31/007 |
| | | | | 303/122.04 |
| 2009/0184568 | A1 | 7/2009 | Bensch et al. | |
| 2010/0025141 | A1 * | 2/2010 | Bensch | B60T 13/683 |
| | | | | 180/271 |
| 2010/0072810 | A1 * | 3/2010 | Bensch | B60T 13/665 |
| | | | | 303/17 |
| 2010/0102173 | A1 * | 4/2010 | Everett | B60T 8/1755 |
| | | | | 244/175 |
| 2010/0237690 | A1 * | 9/2010 | Forster | B60T 13/263 |
| | | | | 303/13 |
| 2011/0012421 | A1 * | 1/2011 | Bensch | B60T 13/662 |
| | | | | 701/78 |
| 2012/0319464 | A1 * | 12/2012 | Lloyd | B60T 17/22 |
| | | | | 303/3 |
| 2014/0103237 | A1 * | 4/2014 | Herges | B60T 15/182 |
| | | | | 251/129.01 |
| 2015/0239441 | A1 * | 8/2015 | Klostermann | B60T 11/108 |
| | | | | 303/7 |
| 2015/0344011 | A1 * | 12/2015 | Casali | B60T 15/226 |
| | | | | 303/7 |
| 2017/0137003 | A1 * | 5/2017 | Grandstaff | B60T 17/22 |
| 2017/0174197 | A1 * | 6/2017 | Eberling | B60T 13/403 |
| 2017/0197603 | A1 * | 7/2017 | Minato | B60T 13/662 |
| 2017/0210365 | A1 * | 7/2017 | Lülfing | B60T 17/18 |
| 2017/0267221 | A1 | 9/2017 | Hecker et al. | |
| 2018/0029570 | A1 * | 2/2018 | Schick | B60T 13/581 |
| 2018/0029571 | A1 * | 2/2018 | Schick | B60T 15/028 |
| 2018/0251112 | A1 * | 9/2018 | Griesser | B60T 17/004 |
| 2019/0152459 | A1 * | 5/2019 | Dieckmann | B60T 13/662 |
| 2019/0193705 | A1 | 6/2019 | Wulf | |
| 2019/0248346 | A1 | 8/2019 | Wulf | |
| 2019/0248349 | A1 * | 8/2019 | Wulf | B60W 10/184 |
| 2019/0248350 | A1 | 8/2019 | Wulf | |
| 2019/0248351 | A1 * | 8/2019 | Wulf | B60T 13/683 |
| 2019/0309847 | A1 * | 10/2019 | Merklein | F16H 63/3483 |
| 2019/0337502 | A1 * | 11/2019 | Farres | B60T 15/027 |
| 2019/0337503 | A1 | 11/2019 | Otremba | |
| 2020/0023820 | A1 | 1/2020 | Van Thiel | |
| 2020/0023827 | A1 | 1/2020 | Van Thiel | |
| 2020/0047730 | A1 * | 2/2020 | Van Thiel | B60T 15/027 |
| 2020/0070795 | A1 * | 3/2020 | Van Thiel | B60T 13/662 |
| 2020/0079341 | A1 * | 3/2020 | Van Thiel | B60T 8/1708 |
| 2020/0094804 | A1 * | 3/2020 | Chlumecky | B60T 17/228 |
| 2020/0139952 | A1 * | 5/2020 | Van Thiel | B60T 13/385 |
| 2020/0148180 | A1 | 5/2020 | Van Thiel | |
| 2021/0284115 | A1 * | 9/2021 | Van Thiel | B60T 17/221 |
| 2021/0387604 | A1 * | 12/2021 | Van Thiel | B60T 15/20 |

FOREIGN PATENT DOCUMENTS

| | | | |
|---|---|---|---|
| CN | 107921945 A | | 4/2018 |
| DE | 10 2005 024 120 A1 | | 12/2006 |
| DE | 10 2005 060 225 A1 | | 6/2007 |
| DE | 10 2007 047 691 A1 | | 4/2009 |
| DE | 10 2012 000 435 A1 | | 7/2013 |
| DE | 10 2014 013 756 B3 | | 2/2016 |
| DE | 10 2016 005 318 A1 | | 11/2017 |
| DE | 10 2016 010 461 A1 | | 3/2018 |
| DE | 10 2016 010 462 A1 | | 3/2018 |
| DE | 10 2016 010 463 A1 | | 3/2018 |
| DE | 10 2016 010 464 A1 | | 3/2018 |
| DE | 10 2017 002 716 A1 | | 9/2018 |
| DE | 10 2017 002 718 A1 | | 9/2018 |
| DE | 10 2017 002 719 A1 | | 9/2018 |
| DE | 10 2017 002 721 A1 | | 9/2018 |
| EP | 1 785 325 A1 | | 5/2007 |
| EP | 2 254 779 B1 | | 12/2010 |
| WO | 2009/098003 A2 | | 8/2009 |
| WO | 2019/048174 A1 | | 3/2019 |

OTHER PUBLICATIONS

English Translation and First Office Action of the Chinese Patent Office dated May 12, 2024 in corresponding Chinese patent application No. 202080083772.X.

International Search Report of the European Patent Office dated Feb. 17, 2021 for international application PCT/EP2020/084045 on which this application is based.

Translation and Written Opinion of the International Searching Authority dated Feb. 17, 2021 for international application PCT/EP2020/084045 on which this application is based.

English Translation and Second Office Action of the Chinese Patent Office dated Oct. 13, 2024 in corresponding Chinese patent application No. 202080083772.X.

* cited by examiner

MONOSTABLE AND FAULT-TOLERANT PARKING BRAKE VALVE ASSEMBLY

CROSS REFERENCE TO RELATED APPLICATIONS

This application is a continuation application of international patent application PCT/EP2020/084045, filed Dec. 1, 2020 designating the United States and claiming priority from German application 10 2019 133 011.4, filed Dec. 4, 2019, and the entire content of both applications is incorporated herein by reference.

TECHNICAL FIELD

The disclosure relates to a parking brake valve assembly for an electronically controllable pneumatic braking system of a vehicle, in particular utility vehicle. The disclosure furthermore relates to an electronically controllable pneumatic braking system, and to a vehicle.

BACKGROUND

In vehicles, in particular utility vehicles, having a pneumatic braking system, formed in particular as an electronic braking system (EBS) or anti-lock system (ABS), for the outputting of brake pressures, electropneumatic valves, for example electropneumatic switching valves connected upstream of relay valves, can be actuated by a control unit (ECU), which electropneumatic valves then, in a manner dependent on a demanded vehicle target deceleration, pneumatically transmit a brake pressure to the brake cylinders of service brakes of the brake system. Modules in which such units are integrated are frequently referred to as axle modulators.

In braking systems for a vehicle combination with a tractor and a trailer, the braking system has a trailer control unit, also referred to as Trailer Control Valve (TCV), which is provided for also providing a pneumatic output, correspondingly to the vehicle target decelerations predefined by the tractor vehicle, via ports, specifically a trailer brake pressure port and a trailer supply pressure port, which are also referred to as yellow and red coupling head. Via the trailer supply pressure port, the trailer vehicle is provided with a supply pressure from a supply, provided for that purpose, of the tractor vehicle, whereas the corresponding brake pressure is output via the trailer brake pressure port.

As a further component or module, braking systems of the above generic type have a parking brake unit, also referred to as an electropneumatic hand brake (EPH). Such parking brake units are commonly operated with so-called spring-type actuators, that is, brake devices which brake one or more axles of the tractor owing to a spring force. In the aerated state, the brakes are released, and in the ventilated state, they are braked. In an unpressurized state, the corresponding vehicle is thus braked. For the activation of the parking brake unit, an electrical switch is generally provided in the driver's cab of the tractor vehicle, via which switch a corresponding signal can be output to an electronic control unit, which then switches one or more electropneumatic valves such that the spring-type actuators are either ventilated or aerated.

The parking brake unit, that is, the electropneumatic handbrake, is used for parking the vehicle, but also as an additional brake in certain situations. That is, in addition to the normal service brakes, the spring-type actuators are at least partially ventilated in order to be used additionally or alternatively to the braking operation. Thus, for example during a purely auxiliary braking operation, braking is performed exclusively via spring-type actuators in the tractor vehicle and service brakes in the trailer vehicle. The service brakes in the tractor vehicle are not actuated during purely auxiliary braking operations. Alternatively, a redundancy mode may also be implemented, in which, for example in the event of a circuit failure at the rear axle, the spring-type actuators are used for assistance as an alternative to the service brakes. The front axle can continue to be braked via service brakes, and the trailer vehicle likewise via service brakes.

The parking brake valve assemblies of the type mentioned at the beginning, relating to the disclosure, are used in such parking brake units or as such parking brake units if the parking brake valve assembly is integrated in a module. Typically, such parking brake valve assemblies operate with a relay valve, for boosting the volume of a pilot control pressure which is provided by the pilot control unit. A typical parking brake valve assembly, in the form of a parking brake module, is disclosed in this applicant's DE 10 2012 000 435 A1. The module disclosed therein has a relay valve which is supplied with a pilot control pressure via a pilot control unit having a 3/2-way valve and a 2/2-way valve. The relay valve boosts the volume of the pilot control pressure and provides the latter to a spring-type actuator port to which one or more spring brake cylinders can be connected. A similar module is disclosed in EP 2 254 779 B1, likewise belonging to the same applicant. A further example of a similar type is disclosed in US 2010/0237690. In addition, further systems are known, for example those which comprise a bistable valve in the pilot control unit. An example in this regard is disclosed in DE 10 2017 002 715 A1 or DE 10 2017 002 714 A1 belonging to the same applicant.

There are also integrated approaches which integrate the parking brake unit with a trailer control valve. Such a system is known, for example, from DE 10 2017 002 953.

Furthermore, in modern electronically controllable pneumatic braking systems, which are used in particular in utility vehicles that are intended for autonomous driving, it is important to provide measures that allow safe deceleration of the utility vehicle even in the event of a fault in the braking system. Approaches here include using fully redundant braking systems, partially redundant braking systems or only different levels in one braking system, such that, in the event of a fault in a first level, the braking system can continue to be operated, at least with restrictions, in a second level.

However, if a double fault occurs, for example, which affects both the primary braking system and the redundant braking system, there is the risk that the utility vehicle can no longer be braked in a controlled manner. In such situations, there is a need to provide a system that allows safety deceleration of the vehicle.

A system that is aimed in particular at achieving high residual availability is known, for example, from US 2017/0267221. The document discloses electrical equipment of a vehicle with an at least partially electric braking and steering device, which comprises: an electric or electromechanical steering device, which is connected to a steering gear and which comprises an electronic steering control device and an electric steering actuator, and a service brake device. As a service brake device, US 2017/0267221 proposes an electropneumatic service brake device which comprises an electromagnetic service brake valve device, an electronic brake control device, electropneumatic modulators and pneumatic wheel brake actuators, wherein the electronic brake control device electrically controls the electropneumatic modulators in order to generate pneumatic brake pressures or brake control pressures for the pneumatic wheel brake actuators on a wheel-specific, axle-specific or side-specific basis. The electropneumatic service brake valve device has a service brake actuation element and also, within an electrical service brake circuit, an electrical channel with an electrical brake signal transmitter that can be actuated by the service brake actuation element. Furthermore, an electronic evaluation device is provided which receives the actuation signals and, in a manner dependent on the actuation signals, inputs braking demand signals into the electronic brake control device and, within at least one pneumatic service brake circuit, comprises at least one pneumatic channel, in which actuation of the service brake actuation element owing to a driver's braking demand causes at least one control piston of the service brake valve device to be loaded with a first actuating force and, in response to this, the control piston makes it possible to generate pneumatic brake pressures or brake control pressures for the pneumatic wheel brake actuators. The electronic evaluation device of the electro-pneumatic service brake valve device furthermore comprises electronic control means for generating, independently of a driver's braking demand, a second actuating force which, in the presence of a braking demand that is independent of the driver's demand, acts on the control piston in the same direction as or in the opposite direction to the first actuating force. The electropneumatic service brake device is supplied by an electrical power source which is independent of a second electrical power source which supplies the electropneumatic service brake valve device with electrical power. It is hereby ensured that, as far as possible, always at least one of the two systems is functional. The electric or electropneumatic steering device is supplied with power by the second electrical power source. It is sought in this way to achieve high residual availability. However, the system is complex and thus cannot be readily implemented in every utility vehicle.

A system that provides electronically pneumatically controlled redundancy is disclosed in US 2019/0152459. The system disclosed in the document uses a bypass valve in order, depending on the failure of a subsystem, to transmit control pressures in order to provide an at least pneumatic supply to the circuit in which an electrical failure has respectively occurred. This, too, increases the residual availability. Similar systems are disclosed in US 2019/0193705 and in US 2019/0248351.

Furthermore, US 2019/0248350 discloses a system and a method in which pilot control valves are electronically controlled by way of a redundancy signal if a failure or a defect is detected in the electronic control of wheel brakes of the braking system. Here, the system seeks to prevent the wheels from locking.

US 2020/0023820, US 2020/0023827, US 2020/0070795 and US 2020/0148180 have disclosed systems in which a redundancy is generated pneumatically in each case. Here, different output brake pressures, for example front axle, rear axle or trailer brake pressures, are used in order to be provided as redundancy pressure to failed systems, such as the front axle brake circuit, rear axle brake circuit, parking brake circuit or trailer brake circuit. In this way, a subordinate pneumatic redundancy level is generated, such that high residual availability is likewise achieved.

Furthermore, systems also exist which incorporate the trailer, as disclosed for example in US 2019/0248346.

SUMMARY

Against this background, an object of the present disclosure is to provide a parking brake valve assembly of the type mentioned at the beginning that has an increased level of safety, and in particular to provide a parking brake valve assembly which does not maintain the released state in the event of serious double faults, but on the contrary to provide a solution permitting controlled braking of the vehicle. In this way, even in the event of fault situations, in which electrical braking can no longer be performed, for example due to a power failure, the vehicle is intended to be transferred in a controlled manner into a safe state and prevented from rolling away.

The disclosure achieves this object in the case of a parking brake valve assembly of the type mentioned at the beginning in that a first compressed air path which receives a first or second supply pressure and has a first monostable valve unit for providing a first parking brake pressure is provided, a second compressed air path which receives the first or the second supply pressure and has a second monostable valve unit for providing a second parking brake pressure is provided, and wherein furthermore a first shuttle valve is provided, having a first shuttle valve port with the first compressed air path and receiving the first parking brake pressure, a second shuttle valve port connected to the second compressed air path and receiving the second parking brake pressure, and a third shuttle valve port which is connectable or connected to a spring brake cylinder, wherein the first shuttle valve in each case outputs the higher of the first parking brake pressure and of the second parking brake pressure to the third shuttle valve port.

According to the disclosure, the respectively higher of the first parking brake pressure and the second parking brake pressure is therefore output at the third shuttle valve port, which is connectable or connected indirectly or directly to one or more spring brake cylinders. Only this, namely the higher of the two parking brake pressures, is then used for aerating the correspondingly connected spring brake cylinder. The spring brake cylinder or the spring brake cylinders can be directly connected to the third shuttle valve port, that is, a volume pressure which is used for aerating the at least one spring brake cylinder is output directly at the third shuttle valve port. On the other hand, it is also conceivable and preferred for a relay valve to first of all be connected to the third shuttle valve port, the relay valve then boosting the volume of the pressure received from the third shuttle valve port and providing the volume-boosted pressure to one or more spring brake cylinders. The core concept consists in actuating the shuttle valve by two separate, monostably configured, compressed air paths. Each of the first and second compressed air paths is monostable, that is, when deenergized, drops back into a switching state and is not configured bistably, as is frequently the case in the prior art, that is, maintains the switched state even when deenergized. However, for as long as one of the first and second compressed air paths supplies a parking brake pressure, namely either the first parking brake pressure or the second parking brake pressure, the spring brake cylinders remain aerated and therefore released. Only when the two compressed air paths do not supply any parking brake pressure are the spring brake cylinders also aerated and therefore applied.

This arrangement therefore provides the possibility of coupling the first compressed air path, for example, to the first brake circuit, and of coupling the second compressed air path, for example, to a second brake circuit, such that the spring brake cylinders are engaged only when both brake circuits fail. This improves the safety of the vehicle in which the parking brake valve assembly is installed. In the event of a severe double fault, in which both the first and the second brake circuit fail, that is, the first and second compressed air paths no longer supply any parking brake pressure either, the vehicle in which the parking brake valve assembly is installed is automatically braked. It is also possible and preferred to couple the first compressed air path to an operating level of the braking system and the second compressed air path to a redundancy level. In this case, the spring brake cylinders are then engaged only when both the operating level and the redundancy level fail.

According to a first embodiment, the first monostable valve unit is switched by a first electronic control unit and the second monostable valve unit by a second electronic control unit. The first and second electronic control unit are preferably independent from each other. For example, the first electronic control unit is the control unit of a central module, and the second electronic control unit is the control unit of an axle modulator, for example front axle modulator or rear axle modulator. It is also conceivable for the second electronic control unit to be the control unit of an integrated parking brake module. Other control units are also suitable. For example, the first electronic control unit is that of a front axle brake circuit, and the second electronic control unit that of a rear axle brake circuit. It is also conceivable and preferred for the first electronic control unit to be that of an operating level, while the second electronic control unit is that of a redundancy level.

Furthermore, it is preferably provided that the first monostable valve unit is supplied by a first voltage source and the second monostable valve unit by a second voltage source. With regard to the first and second voltage sources, the same applies as has also been described with respect to the first and second electronic control units. To this extent, it is preferred that the first voltage source is assigned, for example, to a front axle brake circuit, and the second voltage source is assigned to a rear axle brake circuit. The first and second voltage sources are preferably independent of each other. It is also conceivable for the first voltage source to be assigned to an operating level and the second voltage source to a redundancy level.

According to a further embodiment, the first monostable valve unit has a first switching valve and a second switching valve which are connected to each other in a pressure-conducting manner such that the first parking brake pressure is output only when the first and the second switching valves are energized, and the second monostable valve unit has a third switching valve and a fourth switching valve which are connected to each other in a pressure-conducting manner such that the second parking brake pressure is output only when the third and the fourth switching valves are energized. In this way, the safety can be increased further. A fault in one of the first and second, or third and fourth switching valves is already sufficient to allow one of the first and second compressed air paths to become depressurized. At the same time, the two valves have to be energized in order to be able to output the corresponding parking brake pressure. The intention by this means is to ensure that the spring pressure is not already output during erroneous switching of one of the valves or during incorrect switching of a valve, but rather only actually when corresponding switching signals are provided for the first and second, or third and fourth switching valves, that is, it is ensured that corresponding master control units and/or voltage sources are functional.

It can preferably be provided in this connection that the first switching valve is configured as a first 3/2-way valve, the second switching valve as a second 3/2-way valve, the third switching valve as a third 3/2-way valve, and the fourth switching valve as a fourth 3/2-way valve, wherein the first and the second 3/2-way valves are pneumatically connected in series, and the third and the fourth 3/2-way valves are pneumatically connected in series. In this way, a particularly simple connection is achieved which is in each case monostable and leads to the series-connected valves in each case having to be switched in order to output the first and/or second parking brake pressure.

Furthermore, it is preferred that the first switching valve has a first switching valve port receiving the supply pressure, a second switching valve port connected to the second switching valve port, and a third switching valve port connected to a vent, wherein, in a first energized switching position, the first switching valve port is connected to the second switching valve port, and, in a deenergized second switching position, the second switching valve port is connected to the third switching valve port. The same preferably also applies to the second, third and fourth switching valves. Accordingly, it is preferably provided that the second switching valve has a fourth switching valve port connected to the second switching valve port, a fifth switching valve port connected to the first shuttle valve port, and a sixth switching valve port connected to a or the vent, wherein, in a first energized switching position, the fourth switching valve port is connected to the fifth switching valve port, and, in a deenergized second switching position, the fifth switching valve port is connected to the sixth switching valve port. In a corresponding manner, the following is preferably also provided for the second compressed air path. The third switching valve has a seventh switching valve port receiving the supply pressure, an eighth switching valve port connected to the fourth switching valve port, and a ninth switching valve port connected to a or the vent, wherein, in a first energized switching position, the seventh switching valve port is connected to the eighth switching valve port, and, in a deenergized second switching position, the eighth switching valve port is connected to the ninth switching valve port. Finally, the fourth switching valve preferably also has a tenth switching valve port connected to the eighth switching valve port, an eleventh switching valve port connected to the second shuttle valve port, and a twelfth switching valve port connected to a or the vent, wherein, in a first energized switching position, the tenth switching valve port is connected to the eleventh switching valve port, and, in a deenergized second switching position, the eleventh switching valve port is connected to the twelfth switching valve port.

In a further embodiment, it is provided that the first compressed air path for ventilating the first shuttle valve port and the second compressed air path for ventilating the second shuttle valve port are in each case connected to an, in particular single, ventilating valve. Via the ventilating valve, the first or the second shuttle valve port can then be ventilated separately from the switching valves in order thereby to ventilate the spring brake cylinders connected to the third shuttle valve port and, consequently, to brake the vehicle. A single ventilating valve is therefore preferably provided both for the first and for the second compressed air path. The ventilating valve is preferably configured such that it has a nonlinear ventilating characteristic. The ventilating valve preferably permits ventilating of the first and second shuttle valve ports, and therefore also the third shuttle valve port, from a release pressure, which corresponds to a parking brake pressure which is sufficient for releasing the spring brake cylinders connected to the third shuttle valve port, to a partial brake pressure with a first gradient, and ventilating the first or second shuttle valve port from the partial brake pressure to a full brake pressure with a second gradient, wherein the first gradient is greater than the second gradient. If the spring brake cylinders are ventilated in this way with the ventilating valve, they are not directly and immediately engaged, but rather this is performed with a nonlinear ventilating characteristic. The nonlinear ventilating characteristic is configured in such a manner that the first or second or third shuttle valve port is initially ventilated from a release pressure to a partial brake pressure with a first gradient. The release pressure is preferably the pressure which is at least required to completely release the spring brake cylinders which are connected to the third shuttle valve port.

According to this embodiment, rapid ventilation is performed from the release pressure to the partial brake pressure. The partial brake pressure is preferably configured in such a manner that the vehicle is not completely, but rather only partially braked. The intention is therefore to already generate a braking operation without axles immediately locking. Ventilation with a second gradient is performed from the partial brake pressure, at which a partial braking operation is carried out, to the full brake pressure, at which the spring brake cylinders are completely ventilated in a corresponding manner and are therefore fully applied. The second gradient is smaller than the first gradient, and therefore the braking of the partial brake pressure to the full brake pressure takes place more slowly. In this way, it is possible to provide safe deceleration of the vehicle and to counteract the risk of direct locking of axles. It is not required in this connection for the first and second gradients to be constant. On the contrary, the first and second gradients can also define nonlinear ventilating characteristics. It is on the contrary preferred for an average gradient during the ventilating of the shuttle valve from the release pressure to the partial brake pressure to be greater than an average gradient during the ventilating of the shuttle valve from the partial brake pressure to the full brake pressure. The first and second gradients are preferably constant. The first gradient preferably corresponds to 1.2 times to 100 times, preferably to 1.2 times to 20 times the second gradient.

In a particularly preferred embodiment, the ventilating valve has a pressure limiter and a throttle which is arranged parallel to the pressure limiter and permits overflowing of the pressure limiter. It is also possible to provide two or more pressure limiters and also two or more throttles per pressure limiter. By provision of the pressure limiter and the throttle for the overflowing of the pressure limiter, it is possible to provide a nonlinear ventilating characteristic in a simple manner. For example, the ventilating of the shuttle valve from the release pressure to the partial brake pressure is predominantly implemented via the pressure limiter, while the ventilating of the shuttle valve from the partial brake pressure to the full brake pressure is predominantly implemented via the throttle.

According to a further embodiment, the parking brake valve assembly furthermore has a trailer valve unit for providing a trailer pressure. The trailer pressure can be a trailer parking brake pressure, or a supply pressure for the trailer, in particular if the parking brake valve assembly is used in a US variant of a braking system. The intention, via the trailer valve unit, is not only for the spring brake cylinders of a tractor vehicle to be able to be actuated, but at the same time also a trailer. In the event that the spring brake cylinders of the vehicle are intended to be engaged via the parking brake valve assembly according to the embodiment described here, they can also be engaged for the trailer via the trailer valve unit. The trailer is therefore braked in this case.

The trailer valve unit is preferably connected to the first and the second compressed air path. In this way, it can have the same functionality as the shuttle valve.

Furthermore, it is preferred that the trailer valve unit receives a first trailer preliminary pressure from the first compressed air path and a second trailer preliminary pressure from the second compressed air path, and outputs the respectively higher as the trailer pressure. The pressure output via the first and second compressed air path is thus used not only for actuating the spring brake cylinders of the tractor vehicle, but can also be used via the trailer valve unit for braking the trailer.

Within this context, it is preferred that the trailer valve unit has a first monostable trailer switching valve connected to the first compressed air path, and a second monostable trailer switching valve connected to the second compressed air path. The trailer valve unit is thus also monostable and can be controlled in accordance with the monostable first and second compressed air paths.

Furthermore, it is preferred that the first trailer switching valve is configured as a first 3/2-way trailer switching valve, and the second trailer switching valve is configured as a second 3/2-way trailer switching valve. To this extent, the first and second trailer switching valves are formed corresponding to the switching valves of the first and second monostable valve units. Identical parts can be used here, and therefore costs can be reduced.

It is preferably provided that the first trailer switching valve has a first trailer switching valve port connected to the second switching valve port, a second trailer switching valve port connected to a second shuttle valve, and a third trailer switching valve port connected to a or the vent. The second trailer switching valve preferably has a fourth trailer switching valve port connected to the eighth switching valve port, a fifth trailer switching valve port connected to a second shuttle valve, and a sixth trailer switching valve port connected to a or the vent. In this way, the first and second trailer switching valves are connected to the first and second compressed air paths and, for their part, then in turn to a second shuttle valve, and analogously to the switching valves of the first and second monostable valve units. In turn, via the second shuttle valve, the respectively higher of the pressure output at the latter is forwarded, in this case specifically to the trailer. In this way, in turn, the same functionality as has already been provided for the tractor vehicle is also implemented for the trailer.

In a second aspect, in the case of an electronically controllable pneumatic braking system for a vehicle, in particular utility vehicle, having a first electronic control unit and a second electronic unit, wherein the first and second electronic control units are configured in such a manner that they can at least partially replace one another in the event of a fault, the object mentioned at the beginning is achieved by a parking brake valve assembly according to one of the above-described embodiments of a parking brake valve assembly according to the first aspect of the disclosure, wherein the first electronic control unit is connected to the first monostable valve unit for providing first switching signals thereto, and the second electronic control unit is connected to the second monostable valve unit for providing second switching signals to the second monostable valve unit. It should be understood that the parking brake valve assembly according to the first aspect of the disclosure and the electronically controllable pneumatic braking system according to the second aspect of the disclosure have identical or similar sub-aspects.

For the situation in which a trailer valve unit is provided, it is preferably furthermore provided, in the case of the electronically controllable pneumatic braking system according to the second aspect of the disclosure, that the first trailer switching valve is controlled by the second electronic control unit and the second trailer switching valve by the first electronic control unit, and further switching signals are accordingly provided by them. A crosswise connection can thereby be achieved. Alternatively, it is also preferred for the first trailer switching valve to be controlled by the first electronic control unit and the second trailer switching valve by the second electronic control unit.

In a third aspect, the object mentioned at the beginning is achieved by a vehicle, in particular utility vehicle, having an electronically controllable pneumatic braking system according to one of the above-described embodiments of an electronically controllable pneumatic braking system according to the second aspect of the disclosure. It should be understood that the vehicle according to the third aspect of the disclosure also has identical or similar sub-aspects to the first two aspects of the disclosure. In this respect, reference is extensively made to the above description.

BRIEF DESCRIPTION OF THE DRAWINGS

The invention will now be described with reference to the drawings wherein.

DESCRIPTION OF THE PREFERRED EMBODIMENTS

Figure 1:
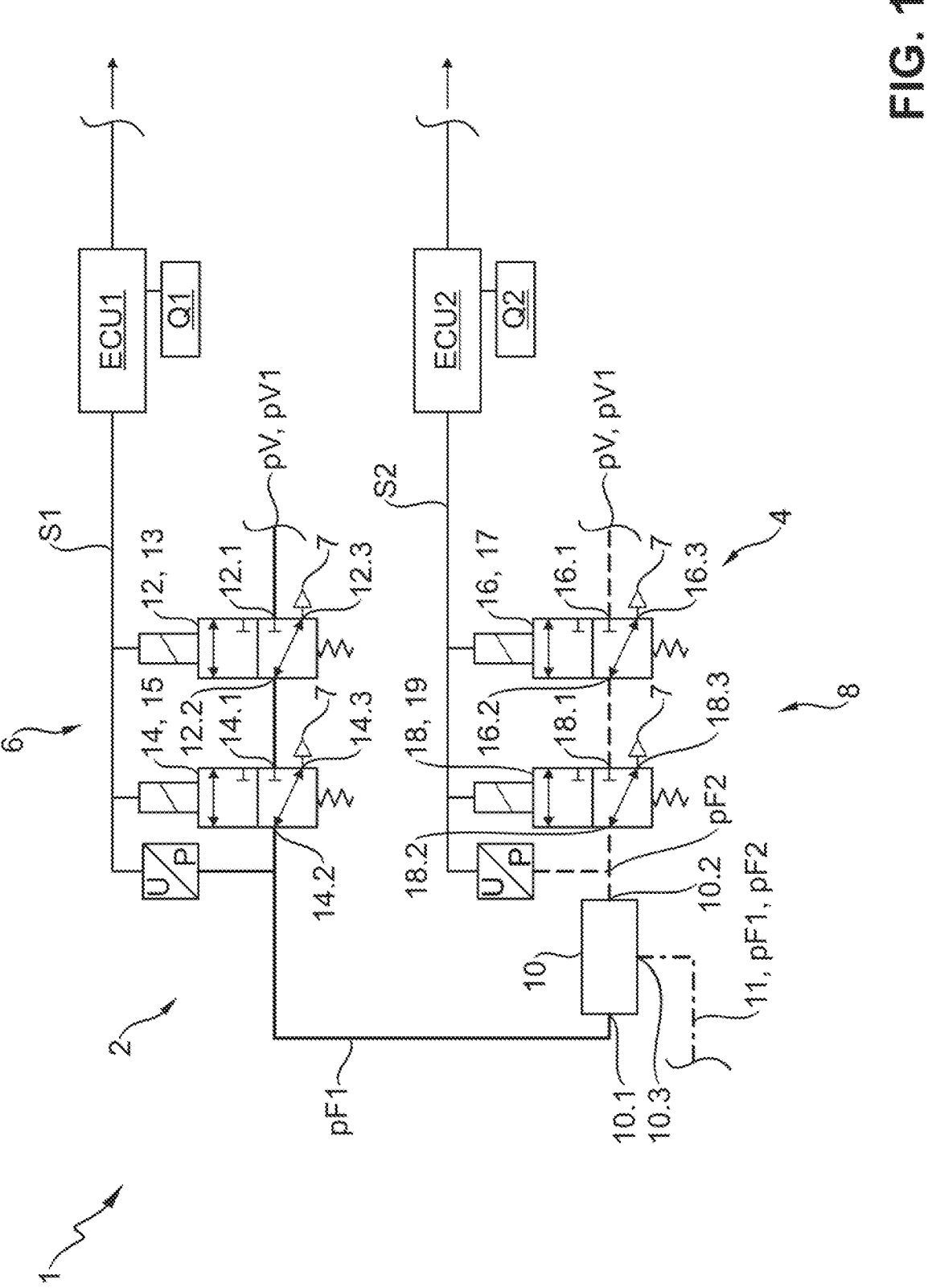
FIG. 1 shows a first embodiment of a parking brake valve assembly.

A parking brake valve assembly 1 (cf. FIG. 1) for an electronically controllable pneumatic braking system 210 (cf. FIG. 5) of a vehicle 200, in particular utility vehicle 202, has a first compressed air path 2 and a second compressed air path 4. Both the first and the second compressed air paths 2, 4 are supplied with supply pressure pV. It can also be provided that the first compressed air path 2 is supplied with a first supply pressure pV1 and the second compressed air path 4 with a second supply pressure pV2, as will be explained in more detail, for example, with regard to FIG. 5. A first monostable valve unit 6 is arranged in the first compressed air path 2 and a second monostable valve unit 8 is arranged in the second compressed air path 4. Via switching the first and second monostable valve units 6, 8, corresponding pressures can be output. Thus, by switching the first monostable valve unit 6, a first parking brake pressure pF1 can be output in the first compressed air path 2, and, by switching the second monostable valve unit 8, a second parking brake pressure pF2 can be output in the second compressed air path 4. The first and second compressed air paths 2, 4 are connected to a first shuttle valve 10 which is configured to output the respectively higher of the first parking brake pressure pF1 and the second parking brake pressure pF2 into a parking brake pressure line 11. The parking brake pressure line 11 can then, for its part, be connected indirectly or directly to spring brake cylinders 220a, 220b, 220c, 220d, as is basically shown with regard to FIGS. 4 and 5 and as will be explained later, further below.

The first shuttle valve 10 is configured as a so-called select high valve and has a first shuttle valve port 10.1 which is connected to the first compressed air path 2 for receiving the first parking brake pressure pF1, a second shuttle valve port 10.2 which is connected to the second compressed air path 4 for receiving the second parking brake pressure pF2, and a third shuttle valve port 10.3 which is configured for outputting the respectively higher of the first and second parking brake pressure pF1, pF2 and, for this purpose, is connected to the parking brake pressure line 11.

In this embodiment, the first monostable valve unit 6 has a first switching valve 12 and a second switching valve 14. The two switching valves 12, 14 are monostable and are in each case deenergized in the first switching position which is shown in FIG. 1 and in which they ventilate the first compressed air path 2 and therefore also the first shuttle valve port 10.1. In more precise terms, the first switching valve 12 is configured as a first 3/2-way valve 13. The first switching valve 12 has a first switching valve port 12.1 which receives supply pressure pV, or the first supply pressure pV1, a second switching valve port 12.2, and a third switching valve port 12.3, which is connected to a vent 7. The second switching valve port 12.2 is connected to the second switching valve 14. The second switching valve 14 is configured as a second 3/2-way valve 15. The second switching valve 14 has a fourth switching valve port 14.1 which is connected to the second switching valve port 12.2 and receives the pressure output by the latter, a fifth switching valve port 14.2, and a sixth switching valve port 14.3, which is in turn connected to a or the vent 7. In the embodiment shown in FIG. 1, the fifth switching valve port 14.2 is connected directly via a corresponding line to the first shuttle valve port 10.1. However, it can also be provided that there are further elements there, and therefore the fifth switching valve port 14.2 is connected only indirectly to the first shuttle valve port 10.1. The first and second switching valves 12, 14 are pneumatically connected in series.

The two switching valves, the first and the second switching valves 12, 14, are connected to a first electronic control unit ECU1 which provides a first switching signal S1 to the switching valves. That is, the first and second switching valves 12, 14 are jointly switched and receive the same first switching signal S1. In the first deenergized switching position of the first switching valve 12, the second switching valve port 12.2 is connected to the third switching valve port 12.3 such that the supply pressure pV cannot be put through by the first switching valve 12. Only when the first switching valve 12 is switched from the first switching position, shown in FIG. 1, into the second switching position, which is not shown in FIG. 1 and in which the first switching valve port 12.1 is connected to the second switching valve port 12.2, can the supply pressure pV be put through from the first switching valve port 12.1 to the second switching valve port 12.2 and correspondingly provided to the fourth switching valve port 14.1. However, if the second switching valve 14 is likewise in the first deenergized switching position shown in FIG. 1, in turn no pressure is output at the first shuttle valve port 10.1 since the fourth switching valve port 14.1 is closed and, on the contrary, the fifth switching valve port 14.2 is connected to the sixth switching valve port 14.3 such that the first shuttle valve port 10.1 is connected via the second switching valve 14 to a or the vent 7. Only when the second switching valve 14 also switches into the second switching position, not shown in FIG. 1, and therefore the fourth switching valve port 14.1 is connected to the fifth switching valve port 14.2 is the pressure output by the first switching valve 12 forwarded through the second switching valve 14 and output as first parking brake pressure pF1 at the first shuttle valve port 10.1. That is, both the first and the second switching valves 12, 14 have to be switched in order to output the first parking brake pressure pF1 at the first shuttle valve port 10.1.

The second compressed air path 4 is constructed analogously, and therefore what is already been stated above with regard to the first compressed air path 2 applies correspondingly here.

The two switching valves in the second compressed air path 4 in the second monostable valve unit 8, the third and the fourth switching valves 16, 18, are connected to a second electronic control unit ECU2 which provides a second switching signal S2 to them. That is, the third and fourth switching valves 16, 18 are jointly switched and receive the same second switching signal S2. In the first deenergized switching position of the third switching valve 16, the eighth switching valve port 16.2 is connected to the ninth switching valve port 16.3, and therefore the supply pressure pV cannot be put through by the third switching valve 16. Only when the third switching valve 16 switches from the first switching position, shown in FIG. 1, into the second switching position, which is not shown in FIG. 1 and in which the seventh switching valve port 16.1 is connected to the eighth switching valve port 16.2, can the supply pressure pV be put through from the seventh switching valve port 16.1 to the eighth switching valve port 16.2 and correspondingly provided at the tenth switching valve port 18.1. If, however, the fourth switching valve 18 is likewise in the first deenergized switching position shown in FIG. 1, in turn no pressure is output at the second shuttle valve port 10.2, since the tenth switching valve port 18.1 is closed and, on the contrary, the eleventh switching valve port 18.2 is connected to the twelfth switching valve port 18.3 such that the second shuttle valve port 10.2 is connected via the fourth switching valve 18 to a or the vent 7. Only when the fourth switching valve 18 also switches into the second switching position, not shown in FIG. 1, and thus the tenth switching valve port 18.1 is connected to the eleventh switching valve port 18.2 is the pressure output by the third switching valve 16 forwarded by the fourth switching valve 18 and output as second parking brake pressure pF2 at the second shuttle valve port 10.2. That is, both the third and the fourth switching valves 16, 18 have to be switched in order to output the second parking brake pressure pF2 at the second shuttle valve port 10.2.

The first electronic control unit ECU1 and the second electronic control unit ECU2 are preferably assigned independently of each other and, for example, to two different modules within the electronically controllable pneumatic braking system 210. Preferably, the first electronic control unit ECU1 is supplied by a first voltage source Q1 and the second electronic control unit ECU2 is supplied by a second voltage source Q2. The first and second voltage sources Q1, Q2 are also preferably independent of each other. In this way, it can be ensured that, as long as one of the first and second electronic control units ECU1, ECU2, or one of the first and second voltage sources Q1, Q2 functions correctly, at least one of the first and the second parking brake pressure pF1, pF2 is output such that, when one of the two electronic control units ECU1, ECU2 is functional, a parking brake pressure pF1, pF2 is output at the third shuttle valve port 10.3, and therefore, in this case, the spring brake cylinders 220a to 220d remain released as a consequence. Only when both the first electronic control unit ECU1, or first voltage source Q1, and the second electronic control unit ECU2, or second voltage source Q2, fail and therefore both the first and the second switching signals S2 are no longer or are no longer correctly provided, are both the first and the second compressed air paths 2, 4 ventilated and, as the result, the spring brake cylinders 220a to 220d are also ventilated and the vehicle 200 braked.

Figure 2:
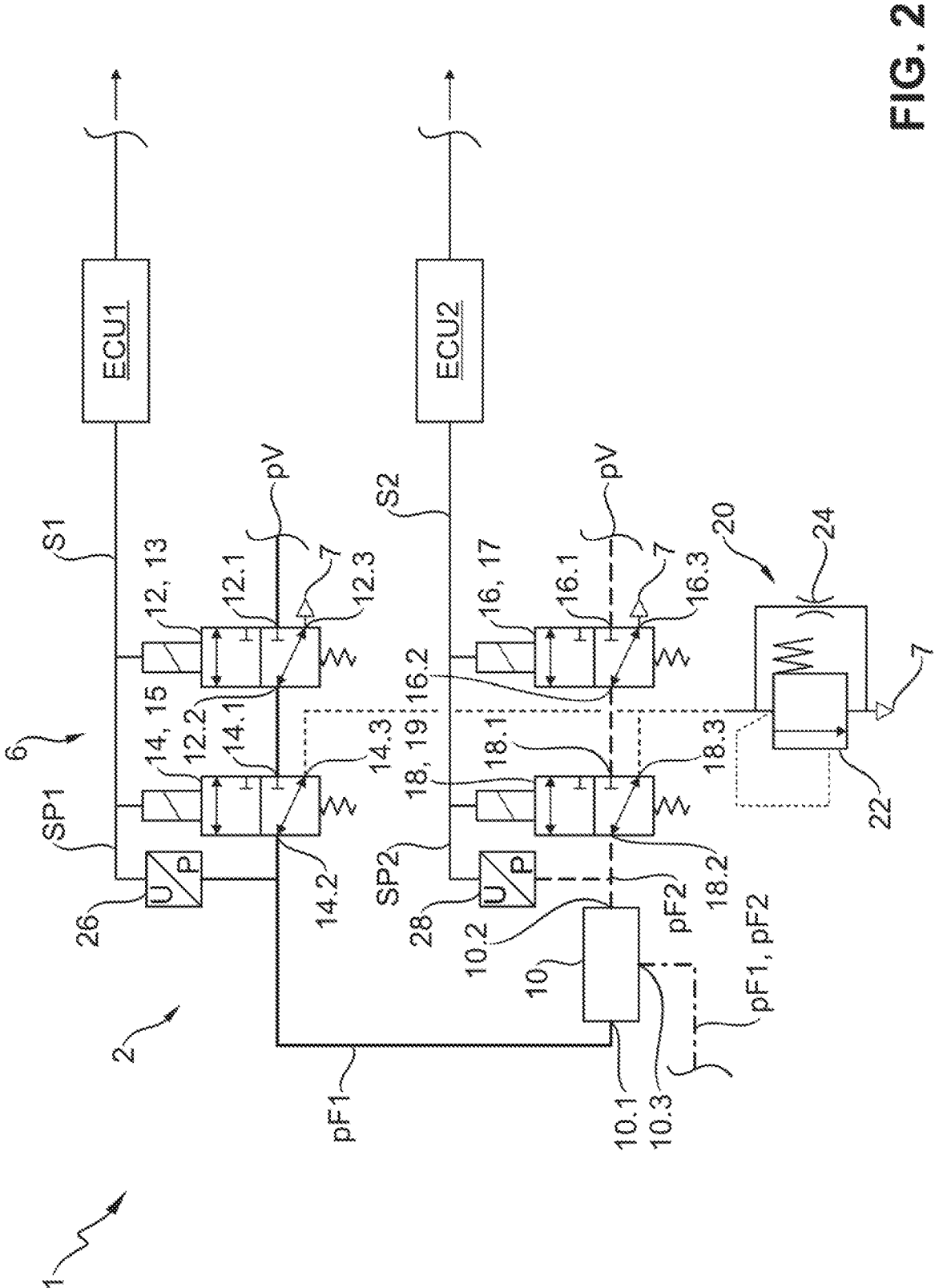
FIG. 2 shows a second embodiment of a parking brake valve assembly.

FIG. 2 now illustrates a second embodiment of the parking brake valve assembly 1, wherein identical and similar elements are referred to by the same reference designations as in FIG. 1. To this extent reference is extensively made to the above description. The differences over the first embodiment (FIG. 1) in particular are emphasized below.

The crucial difference in the second embodiment in comparison to the first embodiment (FIG. 1) is that a ventilating valve 20 is provided.

In the embodiment shown in FIG. 2, the ventilating valve 20 is formed from a pressure limiter 22 with a throttle 24 which is arranged parallel thereto and permits overflowing of the pressure limiter 22. The pressure limiter 22 itself is then in turn connected to a vent or the vent 7.

The combination in the ventilating valve 20 with pressure limiter 22 and throttle 24 permits a nonlinear ventilating characteristic E (cf. FIG. 3) to be implemented in a simple manner. In the event that a fault occurs in the electronically controllable pneumatic braking system 210 and, as a consequence, the first and second electronic control units ECU1, ECU2 fail, and therefore the first and the second switching signals S1, S2 are no longer provided, the first and second compressed air paths 2, 4 are connected via the second switching valve 14 and the third switching valve 16 to the ventilating valve 20 and thus ventilated. The pressure limiter 22 then firstly permits ventilation to a partial brake pressure pLT with a gradient G1 (cf. FIG. 3) and, as soon as the limit pressure, in this case the partial brake pressure pLT, is reached, a residual ventilating of the first and second shuttle valve ports 10.1, 10.2 to a full brake pressure pLV, which can preferably correspond to the ambient pressure, is realized via the throttle 24, wherein this is performed with a second gradient G2.

Figure 3:
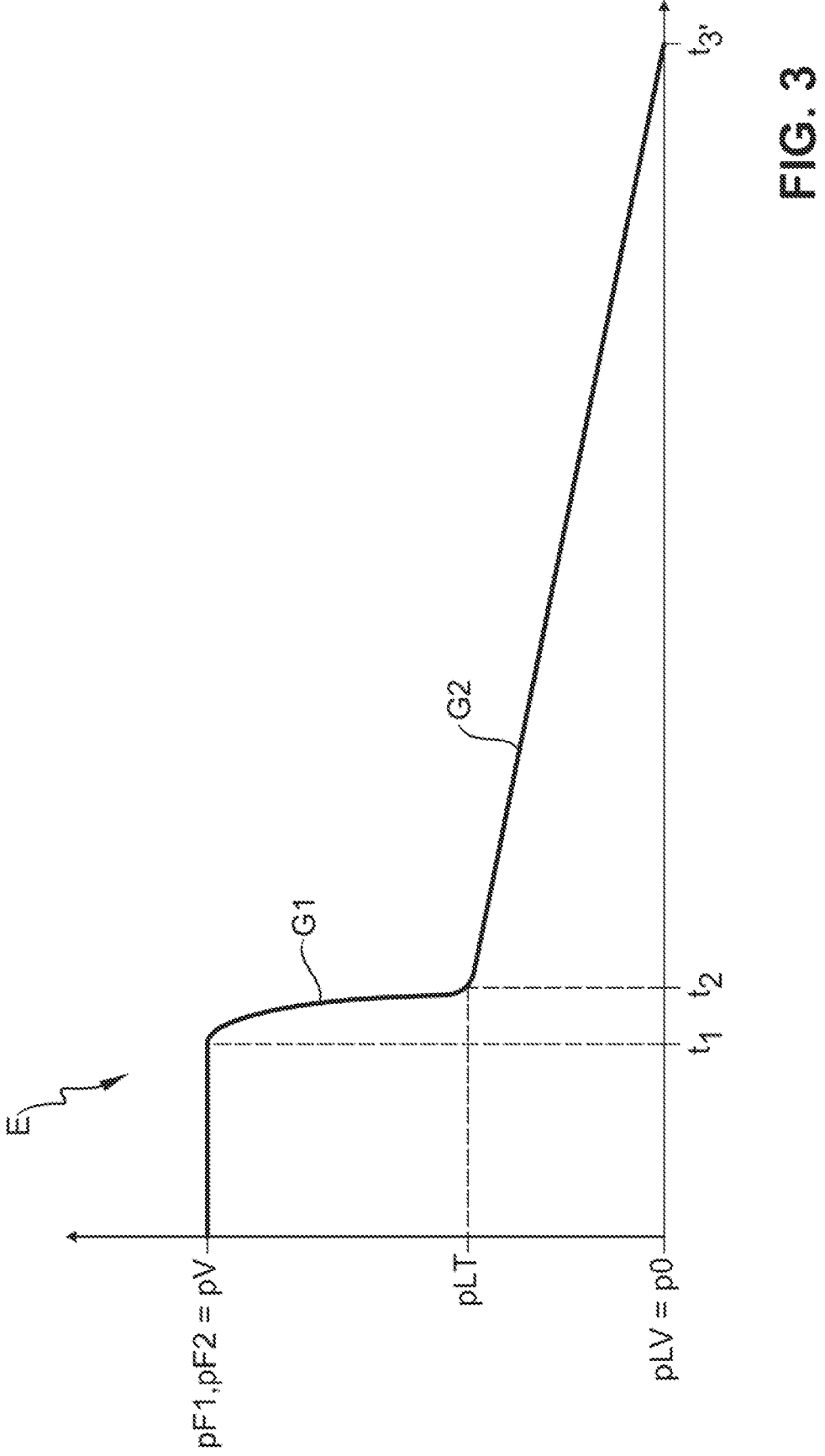
FIG. 3 shows an illustration of a nonlinear ventilating characteristic.

As can be gathered in particular from FIG. 3, the first gradient G1 is significantly greater than the second gradient G2. At the time t1 at which both the first and the second electronic control unit ECU1, ECU2 fail, and the first and second switching signals S1, S2 are no longer provided, the third shuttle valve port 10.3 is ventilated with the first gradient G1, wherein the pressure drops from the first or second parking brake pressure pF1, pF2, which can correspond to the supply pressure pV, to the partial brake pressure pLT. If this is achieved (time t2), the pressure drops from the partial brake pressure pLT to the full brake pressure pLV with the second gradient G2. The full brake pressure pLV is then reached only at the time t3. As can easily be gathered from FIG. 3, the distance between the second time t2 and the third time t3 is significantly greater than the distance between the first time t1 and the second time t2, namely is approximately 15.5 times as long. As likewise emerges from FIG. 3, the first gradient G1 is approximately 20 times the size of the second gradient G2, wherein the first gradient G1 is likewise nonlinear and the second gradient G2 substantially linear. The first gradient G1 is in fact formed in accordance with an exponential function, wherein the mean value of the first gradient G1 is approximately 4.2 in the example shown in FIG. 3. Other magnitudes and ratios are also preferred, for example a factor of 10 or more. It is important that rapid ventilation is performed from the first or second parking brake pressure pF1, pF2 to the partial brake pressure pLT in order to rapidly achieve partial braking and thus a partial deceleration of the vehicle 200, but then slow ventilation is performed from the partial brake pressure pLT to the full brake pressure pLV in order to prevent axles VA, HA from locking and an uncontrolled deceleration of the vehicle 200.

In FIGS. 1 and 2, first and second pressure sensors 26, 28 can furthermore be seen. The first pressure sensor 26 is arranged between the second switching valve 14 and the first shuttle valve 10 and therefore detects the first parking brake pressure pF1, which is output by the second switching valve 14. The second pressure sensor 28 is arranged between the fourth switching valve 18 and the first shuttle valve 10 and therefore detects the second parking brake pressure pF2, which is output by the fourth switching valve 18. The first pressure sensor 26 provides a first pressure signal SP1 to the first electronic control unit ECU1, and the second pressure sensor 28 provides a second pressure signal SP2 to the second electronic control unit ECU2. In this way, the first and second electronic control units ECU1, ECU2 can determine whether the first and second switching valves 12, 14, and third and fourth switching valves 16, 18, respectively, function correctly and, when the first or second switching signals S1, S2 are output, the first or second parking brake pressure pF1, pF2 is actually output.

Figure 4:
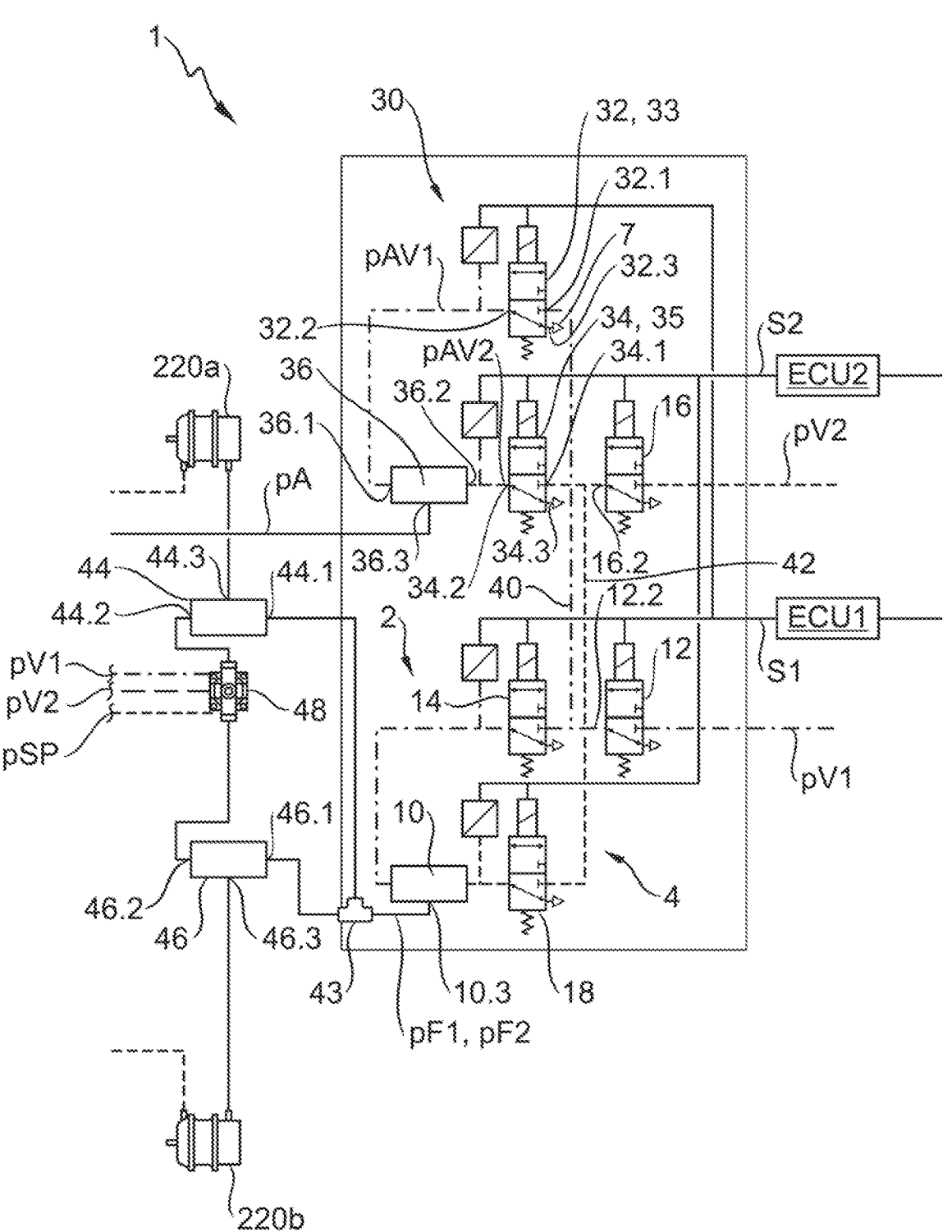
FIG. 4 shows a third embodiment of a parking brake valve assembly.

FIG. 4 illustrates a third embodiment of the parking brake valve assembly 1. Identical and similar elements are in turn referred to by the same reference designations as in the first two embodiments (FIG. 1, FIG. 2), and therefore reference is extensively made to the above description. The differences over the first two embodiments (FIG. 1, FIG. 2) in particular are also explained below.

The crucial difference in the third embodiment (FIG. 4) with regard to the first embodiment (FIG. 1) consists in that a trailer valve unit 30 is provided. The trailer valve unit 30 serves to output a trailer pressure pA which can then be provided via a trailer control valve 212 to a trailer (not shown) connected thereto. By this means, the trailer should then be braked in accordance with the tractor vehicle. Since trailers sometimes do not have any spring brake cylinders, but rather have to be actively braked by a positive brake pressure, it may be necessary for an inverter to be provided in the trailer control valve 212. However, these explanations are basically known and will not be entered into in more detail below.

According to the third embodiment shown in FIG. 4, the trailer valve unit 30 is integrated in the parking brake valve assembly 1. In principle, it should be understood here that, for this purpose, a full duplication of the valves of the first and second embodiments (FIG. 1, FIG. 2) is not required and instead a total of only six switching valves are used, and therefore two valves can be saved in respect of a full duplication. For this purpose, the trailer valve unit 30 is also integrated in the first and the second compressed air paths 2, 4.

In detail, the first and third switching valves 12, 16 are used as joint switching valves both with the parking brake pressure pF1, pF2 and for the trailer pressure pA. A first trailer pilot control line 40 then branches off between the first and second switching valve 12, 14 in the first compressed air path 2 and leads to a first monostable trailer switching valve 32. In an analogous manner, a second trailer pilot control line branches off between the third and fourth switching valves 16, 18 and leads to a second monostable trailer switching valve 34. The first monostable trailer switching valve 32 is therefore assigned to the first compressed air path 2 and the second monostable trailer switching valve 34 is assigned to the second compressed air path 4.

The first monostable trailer switching valve accordingly receives the pressure output from the first switching valve 12 when the latter switches from the first switching position, shown in FIG. 4, into the second switching position, not shown in FIG. 4. If the first monostable trailer switching valve 32 also switches from the first switching position, shown in FIG. 4, into the second switching position, not shown in FIG. 4, it outputs a pressure which is then provided at a second shuttle valve 36. In an analogous manner, the second monostable trailer switching valve 34 receives the pressure output from the third switching valve 16 and, when the second monostable trailer switching valve 34 switches into the second switching position, not shown in FIG. 4, it outputs the pressure received from the third switching valve at the second shuttle valve 36. The second shuttle valve 36 then in turn outputs the higher of the first and second trailer preliminary pressure pAV1, pAV2 as trailer pressure pA.

More precisely, the first monostable trailer switching valve 32 is configured as a first 3/2-way trailer switching valve 33. It has a first trailer switching valve port 32.1 which is connected to the first trailer pilot control line 40, a second trailer switching valve port 32.2 which is connected to the second shuttle valve 36, more precisely to a fourth shuttle valve port 36.1, and a third trailer switching valve port 32.3, which is connected to a or the vent 7. In the first deenergized switching position shown in FIG. 4, the first monostable trailer switching valve 32 connects the second trailer switching valve port 32.2 to the third trailer switching valve port 32.3 such that the fourth shuttle valve port 36.1 is ventilated. In the second switching position, not shown in FIG. 4, the first trailer switching valve port 32.1 is connected to the second trailer switching valve port 32.2 such that the first trailer preliminary pressure pAV1 is output.

In an analogous manner, the second monostable trailer switching valve 34 is configured as a second 3/2-way trailer switching valve 35. It has a fourth trailer switching valve port 34.1 which is connected to the second trailer pilot control line 42. Furthermore, it has a fifth trailer switching valve port 34.2 which is connected to the second shuttle valve 36, more precisely to a fifth shuttle valve port 36.2, and a sixth trailer switching valve port 34.3, which is connected to a or the vent 7. In turn, in the first deenergized switching position, shown in FIG. 4, of the second monostable trailer switching valve 34, the fifth trailer switching valve port 34.2 is connected to the sixth trailer switching valve port 34.3 such that the fifth shuttle valve port 36.2 is ventilated. In the second switching position, not shown in FIG. 4, of the second monostable trailer switching valve 34, the fourth trailer switching valve port 34.1 is connected to the fifth trailer switching valve port 34.2 such that the second trailer preliminary pressure pAV2 is output at the fifth shuttle valve port 36.2. The second shuttle valve 36 then outputs the higher of the first trailer preliminary pressure pAV1, which is present at the fourth shuttle valve port 36.1, and the second trailer preliminary pressure pAV2, which is present at the fifth shuttle valve port 36.2, at a sixth shuttle valve port 36.3, namely as trailer pressure pA.

The first and second monostable trailer switching valves 32, 34 are also connected to the first and second electronic control units ECU1, ECU2 in accordance with the first and second monostable valve units 6, 8. To this extent, the first monostable trailer switching valve 32, which is assigned to the first compressed air path 2, is also controlled by the first electronic control unit ECU1 and switched by the first switching signal S1. In an analogous manner, the second monostable trailer switching valve 34, which is assigned to the second compressed air path 4, is controlled by the second electronic control unit ECU2, specifically via the second switching signal S2. FIG. 4 shows a further special feature which will now be described below.

Third and fourth shuttle valves 44, 46 are connected pneumatically downstream of the first shuttle valve 10. More precisely, the third shuttle valve port 10.3, at which the higher of the first and second parking brake pressure pF1, pF2 is in each case output, is connected via a T-piece 43 both to a seventh shuttle valve port 44.1 of the third shuttle valve 44 and to a tenth shuttle valve port 46.1 of the fourth shuttle valve 46. The third shuttle valve 44 furthermore has an eighth shuttle valve port 44.2 and a ninth shuttle valve port 44.3. The third shuttle valve is configured as a select high valve and outputs the respectively higher pressure, which is present at the seventh and eighth shuttle valve port 44.1, 44.2, at the ninth shuttle valve port 44.3. The ninth shuttle valve port 44.3 is connected to the spring brake cylinder 220a in order to aerate or ventilate the latter.

In an analogous manner, the fourth shuttle valve also has, in addition to the tenth shuttle valve port 46.1, an eleventh shuttle valve port 46.2 and a twelfth shuttle valve port 46.3, wherein the fourth shuttle valve 46 is configured to output the respectively higher of the pressure present at the tenth and eleventh shuttle valve port 46.1, 46.2 at the twelfth shuttle valve port 46.3. The twelfth shuttle valve port 46.3 is connected to a spring brake cylinder 220b in order to aerate or ventilate the latter.

Figure 5:
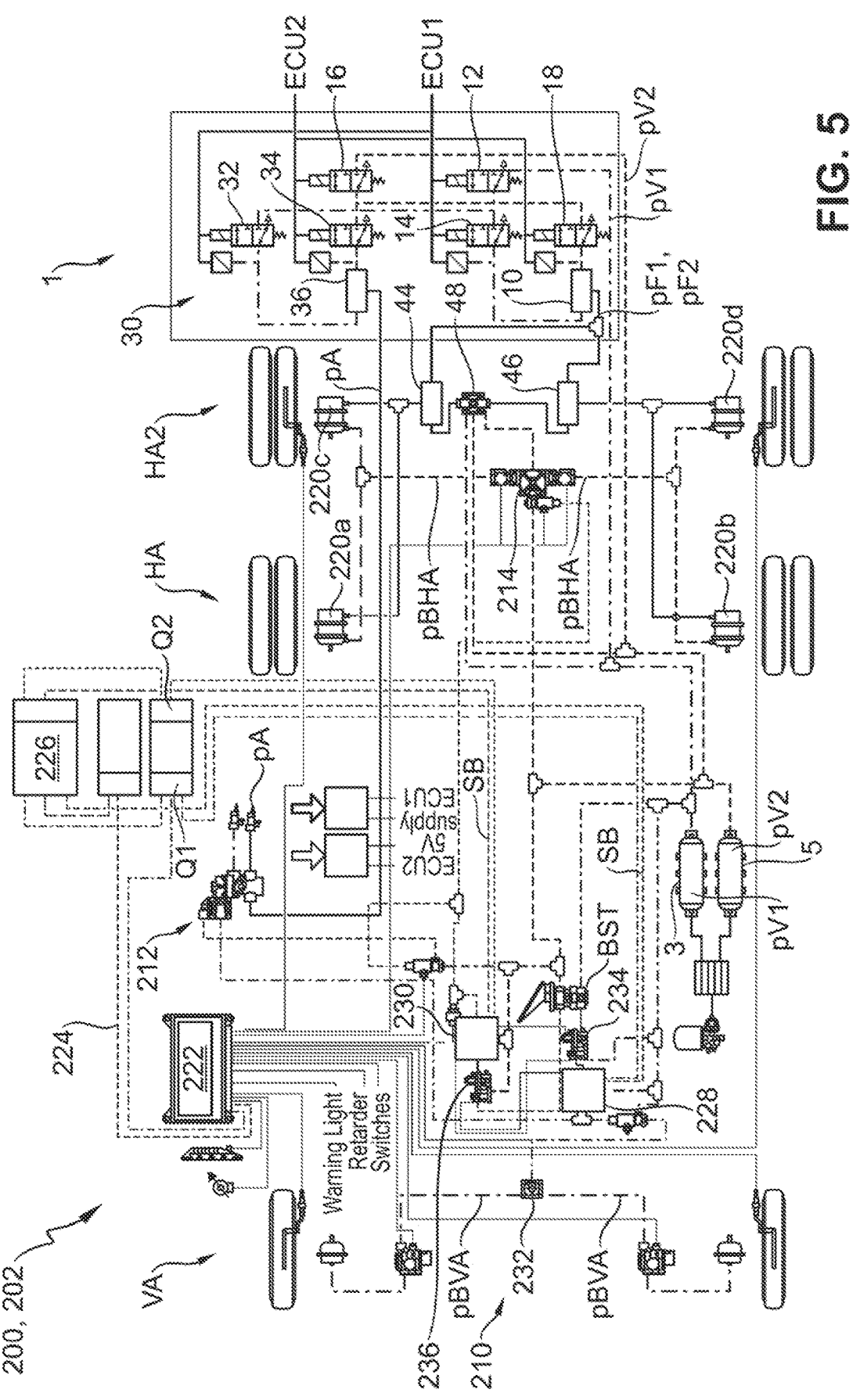
FIG. 5 shows an electronically controllable pneumatic braking system.

The eighth shuttle valve port 44.2 and the eleventh shuttle valve port 46.2 are, for their part, connected to a parking brake relay valve 48 which is fed by the first and second supply pressure pV1, pV2 and receives a parking brake control pressure pSP as control pressure. The parking brake control pressure pSP is provided by another unit, for example by a parking brake switch, a parking brake module or the like, and, with respect to FIG. 5, is provided by a rear axle relay valve 214 in order, in a normal driving mode, to aerate and therefore to release the spring brake cylinders 220a, 220d. However, via the rear axle relay valve 214, the spring brake cylinders 220a to 220d can also be used for additional braking or can be acted upon via an anti-compounding function. Via the latter, the first or second parking brake pressure pF1, pF2 output by the parking brake valve assembly 1 can therefore be overridden in order, in the event that the parking brake valve assembly 1 is not functional or does not correctly function, or the vehicle 200 is in a deenergized parked state, to aerate and therefore release the spring brake cylinders 220a to 220d, if this is required.

FIG. 5 illustrates an electronically controllable pneumatic braking system 210 for a vehicle 200, wherein the vehicle 200 is configured as a utility vehicle 202 and has a front axle VA and a rear axle HA, and a second rear axle HA2. As can be seen from the comparison of FIGS. 4 and 5, the parking brake valve assembly 1 according to a third embodiment (FIG. 4) is implemented in the electronically controllable pneumatic braking system 210 according to FIG. 5. Identical and similar elements are in turn provided with the same reference designations, and therefore reference is extensively made to the above description.

The electronically controllable pneumatic braking system 210 has a central module 222 which is connected via a vehicle bus 224 to a unit for autonomous driving 226. The central module 222 is supplied here by the first voltage source Q1.

Furthermore, the electronically controllable pneumatic braking system 210 has a first primary modulator 228, which is provided for controlling the front axle VA and comprises the first electronic control unit ECU1, and a second primary modulator 230, which is provided for controlling the rear axle and comprises the second electronic control unit ECU2. Both the first and the second primary modulators 228, 230 are connected via the vehicle bus 224 to the unit for autonomous driving 226 and from the latter receive electronic brake request signals SB which are used by them for outputting a front axle brake pressure pBVA and a rear axle brake pressure pBHA. For this purpose, the first primary modulator 228 receives the first supply pressure pV1 from the first compressed air supply 3, and the second primary modulator 230 receives the second supply pressure pV2 from a second compressed air supply 5. The first primary modulator 228 is connected to the first voltage source Q1 and the second primary modulator 230 to the second voltage source Q2. The first primary modulator 228 furthermore pneumatically controls a front axle relay valve 232, while the second primary modulator 230 pneumatically controls the rear axle relay valve 214. The front axle relay valve 232 and rear axle relay valve 214 do not have their own intelligence.

In order to represent a redundancy level, furthermore a first secondary modulator 234 and a second secondary modulator 236 are provided which, for their part, receive the first and second supply pressures pV1, pV2, respectively. The first and second secondary modulators 234, 236 are formed pneumatically, with electromagnetically switchable valves (not shown), but without their own intelligence. They are pneumatically connected to a brake value transmitter BST which, at the first and second secondary modulators 234, 236, outputs corresponding pressures which can then be used by the first and second secondary modulators 234, 236. The first and second secondary modulators 234, 236 are pneumatically connected to the first and second primary modulators 228, 230 in order, in the event of redundancy, if the first and/or second primary modulators 228, 230 fail, to pneumatically control them. The corresponding electromagnetic switching valves in the first and second secondary modulators 234, 236 are each controlled crosswise, that is, the first secondary modulator 234, which is pneumatically connected to the first primary modulator 228 in order to control the front axle VA, receives electrical switching signals for its electromagnetically switchable valves from the second primary modulator 230, for the situation in which the first primary modulator 228 fails. The second secondary modulator 236, which is pneumatically connected to the second primary modulator 230 in order to control the rear axle(s) HA, HA2, receives switching signals for its electromagnetically switchable valves from the first primary modulator 228, for the situation in which the second primary modulator 230 fails.

For the situation in which both the first and the second primary modulators 228, 230 fail, no first and second switching signals S1, S2 in the form referred to above are output by them either, and therefore, as a result, the first and second parking brake pressures pF1, pF2 are no longer output and optionally also the trailer pressure pA is no longer output. As a result, the spring brake cylinders 220*a* to 220*d* of the vehicle 200 are aerated and therefore applied, and the trailer is optionally braked. In this way, a further redundancy is introduced, for the situation in which both the first primary modulator 228 and the second primary modulator 230 fail. In this case, the vehicle 200 can then always still be braked in a controlled manner, preferably with the nonlinear ventilating characteristic E described with regard to FIG. 3.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

1 parking brake valve assembly
2 first compressed air path
3 first compressed air supply
4 second compressed air path
5 second compressed air supply
6 first monostable valve unit
7 vent
8 second monostable valve unit
10 first shuttle valve
10.1 first shuttle valve port
10.2 second shuttle valve port
10.3 third shuttle valve port
11 parking brake pressure line
12 first switching valve
12.1 first switching valve port
12.2 second switching valve port
12.3 third switching valve port
13 first 3/2-way valve
14 second switching valve
14.1 fourth switching valve port
14.2 fifth switching valve port
14.3 sixth switching valve port
15 second 3/2-way valve
16 third switching valve
16.1 seventh switching valve port
16.2 eighth switching valve port
16.3 ninth switching valve port
17 third 3/2-way valve
18 fourth switching valve
18.1 tenth switching valve port
18.2 eleventh switching valve port
18.3 twelfth switching valve port
19 fourth 3/2-way valve
20 ventilating valve
22 pressure limiter
24 throttle
26 first pressure sensor
28 second pressure sensor
30 trailer valve unit
32 first monostable trailer switching valve
32.1 first trailer switching valve port
32.2 second trailer switching valve port
32.3 third trailer switching valve port
33 first 3/2-way trailer switching valve
34 second monostable trailer switching valve
34.1 fourth trailer switching valve port
34.2 fifth trailer switching valve port
34.3 sixth trailer switching valve port
35 second 3/2-way trailer switching valve
36 second shuttle valve

36.1 fourth shuttle valve port
36.2 fifth shuttle valve port
36.3 sixth shuttle valve port
40 first trailer pilot control line
42 second trailer pilot control line
43 T-piece
44 third shuttle valve
44.1 seventh shuttle valve port
44.2 eighth shuttle valve port
44.3 ninth shuttle valve port
46 fourth shuttle valve
46.1 tenth shuttle valve port
46.2 eleventh shuttle valve port
46.3 twelfth shuttle valve port
48 parking brake relay valve
200 vehicle
202 utility vehicle
210 electronically controllable pneumatic braking system
212 trailer control valve
214 rear axle relay valve
220*a*, 220*b*, 220*c*,
220*d* spring brake cylinder
222 central module
224 vehicle bus
226 unit for autonomous driving
228 first primary modulator
230 second primary modulator
232 front axle relay valve
234 first secondary modulator
236 second secondary modulator
BST brake value transmitter
E ventilating characteristic
ECU1 first electronic control unit
ECU2 second electronic control unit
G1 first gradient
G2 first gradient
pA trailer pressure
pAV1 first trailer preliminary pressure
pAV2 second trailer preliminary pressure
pF1 first parking brake pressure
pF2 second parking brake pressure
pLT partial brake pressure
pLV full brake pressure
pSP parking brake control pressure
pV supply pressure
pV1 first supply pressure
pV2 second supply pressure
Q1 first voltage source
Q2 second voltage source
S1 first switching signal
S2 second switching signal
SB electronic brake request signal
SP1 first pressure signal
SP2 second pressure signal
VA front axle
HA rear axle

What is claimed is:

1. A parking brake valve assembly for an electronically controllable pneumatic braking system of a vehicle, the parking brake valve assembly having first and second modules performing respective functions different from each other, the parking brake valve assembly comprising:

a first compressed air path receiving a first or second supply pressure (pV, pV1, pV2) and having a first monostable valve unit for providing a first parking brake pressure (pF1);

a second compressed air path receiving said first or second supply pressure (pV, pV1, pV2) and having a second monostable valve unit for providing a second parking brake pressure (pF2);

a first shuttle valve having: a first shuttle valve port with said first compressed air path and receiving said first parking brake pressure (pF1); a second shuttle valve port with said second compressed air path and receiving said second parking brake pressure (pF2); and, a third shuttle valve port connectable to a spring brake cylinder;

said first shuttle valve being configured to respectively output the higher of said first parking brake pressure (pF1) and of said second parking brake pressure (pF2) to said third shuttle valve port;

a first electronic control unit (ECU1);

a second electronic control unit (ECU2);

said first monostable valve unit being switchable by said first electronic control unit (ECU1) and said second monostable valve unit being switchable by said second electronic control unit (ECU2);

said first electronic control unit (ECU1) and said second electronic control unit (ECU2) being assigned independently of each other to corresponding ones of said first and second modules as respective control units thereof;

a first voltage source;

a second voltage source;

said first monostable valve unit being supplied by said first voltage source;

said second monostable valve unit being supplied by said second voltage source; and, said first and second voltage sources being independent of each other so as to ensure that, as long as one of said first electronic control unit (ECU1) and said second electronic control unit (ECU2), or one of said first and second voltage sources functions correctly, at least one of the first parking brake pressure (pF1) and the second parking brake pressure (pF2) is output such that, when one of said first electronic control unit (ECU1) and said second electronic control unit (ECU2) is functional, the parking brake pressure (pF1, pF2) is output at the third shuttle valve port.

2. The parking brake valve assembly of claim 1, wherein said first compressed air path for ventilating the first shuttle valve port and said second compressed air path for ventilating said second shuttle valve port are respectively connected to a single, ventilating valve.

3. The parking brake valve assembly of claim 1, further comprising:

a trailer valve unit for providing a trailer pressure (pA), wherein the trailer valve unit is connected to said first compressed air path and to said second compressed air path.

4. The parking brake valve assembly of claim 3, wherein the trailer valve unit is connected to said first compressed air path and to said second compressed air path.

5. The parking brake valve assembly of claim 4, wherein said trailer valve unit receives a first trailer preliminary pressure (pAV1) from the first compressed air path and a second trailer preliminary pressure (pAV2) from the second compressed air path, and outputs the respectively higher first or second trailer preliminary pressure (pAV1, pAV2) as the trailer pressure (pA).

6. The parking brake valve assembly of claim 3, wherein said trailer valve unit has a first monostable trailer switching valve connected to said first compressed air path, and a second monostable trailer switching valve connected to said second compressed air path.

7. The parking brake valve assembly of claim 6, wherein:

said first monostable trailer switching valve has a first trailer switching valve port connected to said second switching valve port, a second trailer switching valve port connected to a second shuttle valve, and a third trailer switching valve port connected to a vent or the vent; and, the second monostable trailer switching valve has a fourth trailer switching valve port connected to an eighth switching valve port, a fifth trailer switching valve port connected to said second shuttle valve, and a sixth trailer switching valve port connected to a vent or said vent.

8. The parking brake valve assembly of claim 6, wherein said first monostable trailer switching valve is configured as a first 3/2-way trailer switching valve, and said second monostable trailer switching valve is configured as a second 3/2-way trailer switching valve.

9. The parking brake valve assembly of claim 8, wherein:

said first monostable trailer switching valve has: a first trailer switching valve port connected to a second switching valve port; a second trailer switching valve port connected to a second shuttle valve; and, a third trailer switching valve port connected to a vent or said vent; and, the second monostable trailer switching valve has: a fourth trailer switching valve port connected to an eighth switching valve port; a fifth trailer switching valve port connected to said second shuttle valve; and, a sixth trailer switching valve port connected to a vent or said vent.

10. A parking brake valve assembly for an electronically controllable pneumatic braking system of a vehicle, the parking brake valve assembly comprising:

a first compressed air path receiving a first or second supply pressure (pV, pV1, pV2) and having a first monostable valve unit for providing a first parking brake pressure (pF1);

a second compressed air path receiving said first or second supply pressure (pV, pV1, pV2) and having a second monostable valve unit for providing a second parking brake pressure (pF2);

a first shuttle valve having: a first shuttle valve port with said first compressed air path and receiving said first parking brake pressure (pF1); a second shuttle valve port with said second compressed air path and receiving said second parking brake pressure (pF2); and, a third shuttle valve port connectable to a spring brake cylinder;

said first shuttle valve being configured to respectively output the higher of said first parking brake pressure (pF1) and of said second parking brake pressure (pF2) to said third shuttle valve port;

said first monostable valve unit having a first switching valve and a second switching valve mutually connected in a pressure conducting manner so as to cause said first parking brake pressure (pF1) to be output only when said first and second switching valves are energized; and, wherein said second monostable valve unit has a third switching valve and a fourth switching valve mutually connected in a pressure-conducting manner so as to cause said second parking brake pressure (pF2) to be output only when said third and fourth switching valves are energized.

11. The parking brake valve assembly of claim 10, wherein:

said first switching valve is configured as a first 3/2-way valve, said second switching valve is configured as a second 3/2-way valve, said third switching valve is configured as a third 3/2-way valve; and, said fourth switching valve is configured as a fourth 3/2-way valve; and, said first and said second 3/2-way valves are pneumatically connected in series, and said third and said fourth 3/2-way valves are pneumatically connected in series.

12. The parking brake valve assembly of claim 10, wherein:

said first switching valve has: a first switching valve port receiving the supply pressure (pV, pV1, pV2), a second switching valve port connected to said second switching valve; and, a third switching valve port connected to a vent;

wherein, in a first energized switching position, said first switching valve port is connected to said second switching valve port, and, in a deenergized second switching position, said second switching valve port is connected to said third switching valve port;

said second switching valve has: a fourth switching valve port connected to said second switching valve port of said first switching valve; a fifth switching valve port connected to said first shuttle valve port; and, a sixth switching valve port connected to a vent or said vent;

wherein, in a first energized switching position, said fourth switching valve port is connected to said fifth switching valve port, and, in a deenergized second switching position, said fifth switching valve port is connected to said sixth switching valve port;

said third switching valve has: a seventh switching valve port receiving said supply pressure (pV, pV1, pV2); an eighth switching valve port connected to said fourth switching valve; and, a ninth switching valve port connected to a vent or said vent;

wherein, in a first energized switching position, said seventh switching valve port is connected to said eighth switching valve port, and, in a deenergized second switching position, said eighth switching valve port is connected to said ninth switching valve port;

said fourth switching valve has: a tenth switching valve port connected to said eighth switching valve port of the third switching valve; an eleventh switching valve port connected to said second shuttle valve port; and, a twelfth switching valve port connected to a vent or said vent; and, wherein, in a first energized switching position, said tenth switching valve port is connected to said eleventh switching valve port, and, in a deenergized second switching position, said eleventh switching valve port is connected to said twelfth switching valve port.

13. The parking brake valve assembly of claim 12, wherein:

a first monostable trailer switching valve has: a first trailer switching valve port connected to said second switching valve port; a second trailer switching valve port connected to a second shuttle valve; and, a third trailer switching valve port connected to a vent or said vent; and, a second monostable trailer switching valve has: a fourth trailer switching valve port connected to said eighth switching valve port; a fifth trailer switching valve port connected to said second shuttle valve; and, a sixth trailer switching valve port connected to a vent or said vent.

14. A parking brake valve assembly for an electronically controllable pneumatic braking system of a vehicle, the parking brake valve assembly comprising:

a first compressed air path receiving a first or second supply pressure (pV, pV1, pV2) and having a first monostable valve unit for providing a first parking brake pressure (pF1);

a second compressed air path receiving said first or second supply pressure (pV, pV1, pV2) and having a second monostable valve unit for providing a second parking brake pressure (pF2);

a first shuttle valve having: a first shuttle valve port with said first compressed air path and receiving said first parking brake pressure (pF1); a second shuttle valve port with said second compressed air path and receiving said second parking brake pressure (pF2); and, a third shuttle valve port connectable to a spring brake cylinder; said first shuttle valve being configured to respectively output the higher of said first parking brake pressure (pF1) and of said second parking brake pressure (pF2) to said third shuttle valve port;

said first compressed air path for ventilating the first shuttle valve port and said second compressed air path for ventilating said second shuttle valve port being respectively connected to a single, ventilating valve; and, said ventilating valve having a pressure limiter and a throttle which is arranged parallel to said pressure limiter and permits overflowing of said pressure limiter.

15. An electronically controllable pneumatic braking system for a vehicle including utility vehicle, the electronically controllable pneumatic braking system having first and second modules for performing respective functions different from each other, the pneumatic braking system comprising:

a first electronic control unit (ECU1) and a second electronic unit (ECU2), wherein said first and second electronic control units (ECU1, ECU2) are configured in such a manner that they can at least partially replace one another in the event of a fault;

a parking brake valve assembly including:

a first compressed air path receiving a first or second supply pressure (pV, pV1, pV2) and having a first monostable valve unit for providing a first parking brake pressure (pF1);

a second compressed air path receiving said first or second supply pressure (pV, pV1, pV2) and having a second monostable valve unit for providing a second parking brake pressure (pF2);

a first shuttle valve having: a first shuttle valve port with said first compressed air path and receiving said first parking brake pressure (pF1); a second shuttle valve port with said second compressed air path and receiving said second parking brake pressure (pF2); and, a third shuttle valve port connectable to a spring brake cylinder;

said first shuttle valve being configured to respectively output the higher of said first parking brake pressure (pF1) and of said second parking brake pressure (pF2) to said third shuttle valve port;

wherein said first electronic control unit (ECU1) is connected to said first monostable valve unit for providing first switching signals (S1) thereto;

said second electronic control unit (ECU2) is connected to said second monostable valve unit for providing second switching signals (S2) to the second monostable valve unit;

said first electronic control unit (ECU1) and said second electronic control unit (ECU2) being assigned independently of each other to corresponding ones of said first and second modules as respective control units thereof;

a first voltage source;

a second voltage source;

said first monostable valve unit being supplied by said first voltage source;

said second monostable valve unit being supplied by said second voltage source; and, said first and second voltage sources being independent of each other so as to ensure that, as long as one of said first electronic control unit (ECU1) and said second electronic control unit (ECU2), or one of said first and second voltage sources functions correctly, at least one of the first parking brake pressure (pF1) and the second parking brake pressure (pF2) is output such that, when one of said first electronic control unit (ECU1) and said second electronic control unit (ECU2) is functional, the parking brake pressure (pF1, pF2) is output at the third shuttle valve port.

16. A vehicle comprising the electronically controllable pneumatic braking system claimed in claim 15.

\* \* \* \* \*